United States Patent
Hohensee et al.

(10) Patent No.: US 7,146,566 B1
(45) Date of Patent: Dec. 5, 2006

(54) METHOD AND SYSTEM FOR MULTIFORMAT PRESENTATION

(75) Inventors: Reinhard Heinrich Hohensee, Boulder, CO (US); Dwight Ross Palmer, Longmont, CO (US); Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/461,521

(22) Filed: Dec. 14, 1999

(51) Int. Cl.
G06F 15/00 (2006.01)
G06F 17/00 (2006.01)
G06F 13/12 (2006.01)

(52) U.S. Cl. .................. 715/523; 715/515; 715/516; 715/539; 710/65; 710/66; 710/68

(58) Field of Classification Search ............. 715/515, 715/516, 523, 539; 710/16, 65, 66, 68, 74
See application file for complete search history.

(56) References Cited

U.S. PATENT DOCUMENTS

| | | | | |
|---|---|---|---|---|
| 4,815,034 | A | 3/1989 | Mackey | 364/900 |
| 5,410,655 | A | 4/1995 | Greenfield et al. | 395/275 |
| 5,485,568 | A | 1/1996 | Venable et al. | 395/155 |
| 5,535,372 | A | 7/1996 | Benhase et al. | 395/500 |
| 5,548,731 | A | 8/1996 | Chang et al. | 395/280 |
| 5,564,109 | A * | 10/1996 | Snyder et al. | 710/8 |
| 5,713,032 | A * | 1/1998 | Spencer | 715/515 |
| 5,758,151 | A | 5/1998 | Milligan et al. | 395/611 |
| 5,767,833 | A | 6/1998 | Vanderwiele et al. | 345/132 |
| 5,813,020 | A * | 9/1998 | Hohensee et al. | 715/515 |
| 5,829,053 | A | 10/1998 | Smith et al. | 711/202 |
| 6,119,137 | A * | 9/2000 | Smith et al. | 715/523 |
| 6,336,124 | B1 * | 1/2002 | Alam et al. | 715/523 |
| 6,343,313 | B1 * | 1/2002 | Salesky et al. | 709/204 |
| 6,590,674 | B1 * | 7/2003 | Orton | 358/1.18 |

FOREIGN PATENT DOCUMENTS

WO  WO 9734240 A1 * 9/1997

* cited by examiner

*Primary Examiner*—William Bashore
*Assistant Examiner*—Chau Nguyen
(74) *Attorney, Agent, or Firm*—Dillon & Yudell LLP

(57) ABSTRACT

Data is stored in multiple formats based on the nature of the data and the characteristics of the possible output devices to minimize processing requirements and processing time while maximizing output quality. A data set is broken into objects and further into units so that each unit within an object contains a similar data type. Units that require less processing power for presentation are stored in a device-independent format. Units that require more processing power for presentation are stored in device-dependent form at determined by the presentation parameters of an attached peripheral presentation device. At presentation time a document database, or storage area, assembles the document from the units determined by the presentation device. The document is composed of data that is specific for the presentation device or data that is device independent. The data is output to a physical output device such as a display, a printer, a fax, or a logical output device such as an email generator or any other data processing system.

13 Claims, 3 Drawing Sheets

METHOD AND SYSTEM FOR MULTIFORMAT PRESENTATION

BACKGROUND OF THE INVENTION

1. Technical Field

The present invention relates in general to data processing systems and in particular to stored documents within data processing systems. More particularly, the present invention relates to presentation of stored documents to various output peripherals of the data processing system. Even more particularly the present invention relates to efficiency in document presentation to the output peripherals.

2. Description of the Related Art

Presentation of stored data within a data processing system may take the form of pixels on a display or dots printed by a printer. Each output mechanism has different requirements for presentation. Each mechanism typically requires different presentation parameters, such as the color space and resolution. For example a screen will commonly require 24 bit RGB data at 72 DPI, while a printer might require 32 bit CMYK data at 600 DPI.

"Tiles" are utilized to break objects or data into multiformat units and use various tile encoding schemes based on the data within a tile (e.g., line art image compressed with G4 coding but a contone image compressed with JPEG). Some systems have also used tiles to describe each object on a page using, at most, one tile per object. Usually the tiles do not overlap, but some systems allow the overlapping of tiles.

Currently, images stored for presentation on different devices within the same system may use OPI (Open Pre-Press Interface) technology or FlashPix technology. OPI is primarily utilized in printing and FlashPIX, jointly developed by Kodak™, Hewlett-Packard Company™, Live Picture, Inc.™ and Microsoft™, is a multi-resolution, tiled file format that stores images at different resolutions. In both cases images are stored in full (i.e., not broken into tiles and each tile stored separately) and the main purpose is to store the images in different resolutions. Since the images are not divided into units, and non-image data is not supported, both FlashPix and OPI technology are generally limited to image files.

Processing power needs to be invoked in an output device (which may not have much processing power) at presentation time. Utilizing a presentation device efficiently requires adequate processing power for each job sent to the device. Accordingly, what is needed is a system and method that allows stored documents to be presented on a variety of output devices with a reduced requirement for processing resources. Additionally, what is needed is a method and system that reduces presentation time of stored documents. Further, what is needed is a system and method that provides a more efficient use of computing resources.

SUMMARY OF THE INVENTION

It is therefore one object of the present invention to provide a method and system that will reduce the time between a document request and presentation of the document.

It is another object of the present invention to provide a method and system for providing a more efficient use of processing power in a data processing system.

It is yet another object of the present invention to provide a method and apparatus for maximizing the achievable output quality when output objects are stored in a persistent storage.

The foregoing objects are achieved as is now described. A method and system for storing data in multiple formats based on the nature of the data and the characteristics of the possible output devices are disclosed. The disclosed invention, when coupled with a data processing system and multiple presentation devices, is designed to minimize processing requirements and processing time while maximizing output quality. The data processing system includes a central processing unit, memory, at least one output device, and a user input device. The method and system provide outputting of a data set to a physical output device such as a display, a printer, a fax, or a logical output device such as an email generator or any other data processing system. In implementing the improved method and system for improving the data set presentation process a data set is broken into objects and further into units so that each unit within an object contains a similar data type. Units that require less processing power for presentation are stored in a device-independent format. Units that require more processing power for presentation are stored in device-independent format and device dependent format determined by the presentation parameters of an attached peripheral presentation device. At presentation time a document database, or storage area, assembles the document from the units determined by the presentation device. The Document is composed of data that is specific for the presentation device or data that is device independent.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
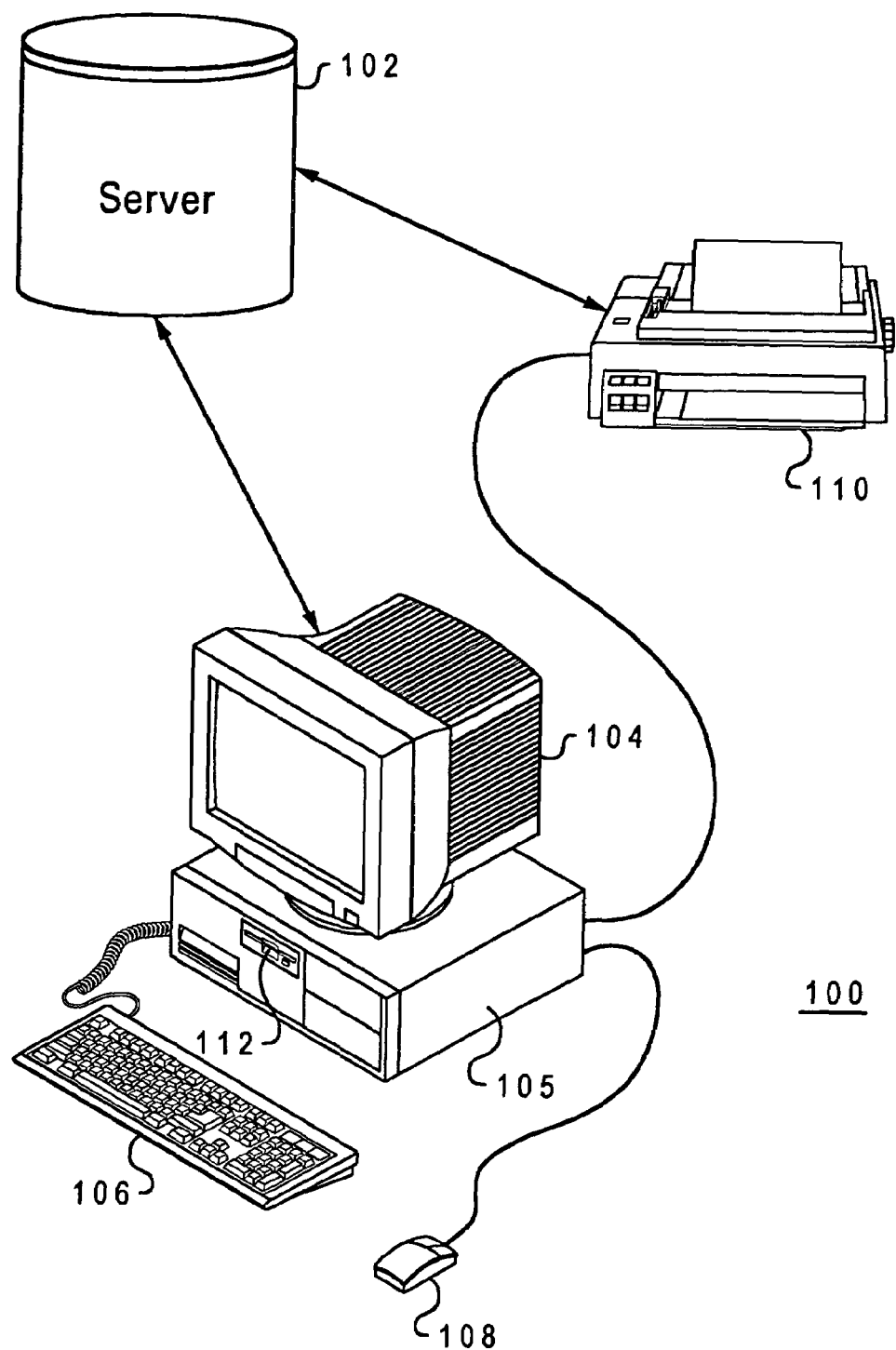
FIG. 1 depicts a high-level block diagram of a data processing system in which a preferred embodiment of the present invention may be implemented.

Referring now to the figures, and in particular to FIG. 1, a network data processing system, in which the present invention can be employed is depicted. As shown data processing system 100 comprises a number of components, which are interconnected together through a basic network. Server 102, computer system 105, printer 110, display 104 are connected to form a rudimentary network wherein server 102 serves printer 110 and computer system 105. More particularly, computer system 105 is coupled to and can drive optional monitor 104 (such as a conventional video display). Computer system 105 can be optionally coupled to input devices such as keyboard 106 or mouse 108. Mouse 108 includes right and left buttons (not shown). An optional output device, such as printer 110, also can be connected to computer system 105. Finally, computer system 105 may include one or more mass storage devices such as diskette drive 112.

Computer system 105 responds to input devices, such as keyboard 106, mouse 108, or local area networking interfaces. Additionally, input/output (I/O) devices, such as floppy diskette drive 112, display 104, printer 110, and local area network communication system (not shown) are connected to computer system 105 in a manner well known. Of course, those skilled in the art are aware that other conventional components also can be connected to the computer system 105 for interaction therewith. In accordance with the present invention, computer system 105 includes a system processor that is interconnected to a random access memory (RAM), a read only memory (ROM), and a plurality of I/O devices.

Specifically, computer system 105 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation (IBM) and "PS/2" is a registered trademark of IBM.

Figure 2:
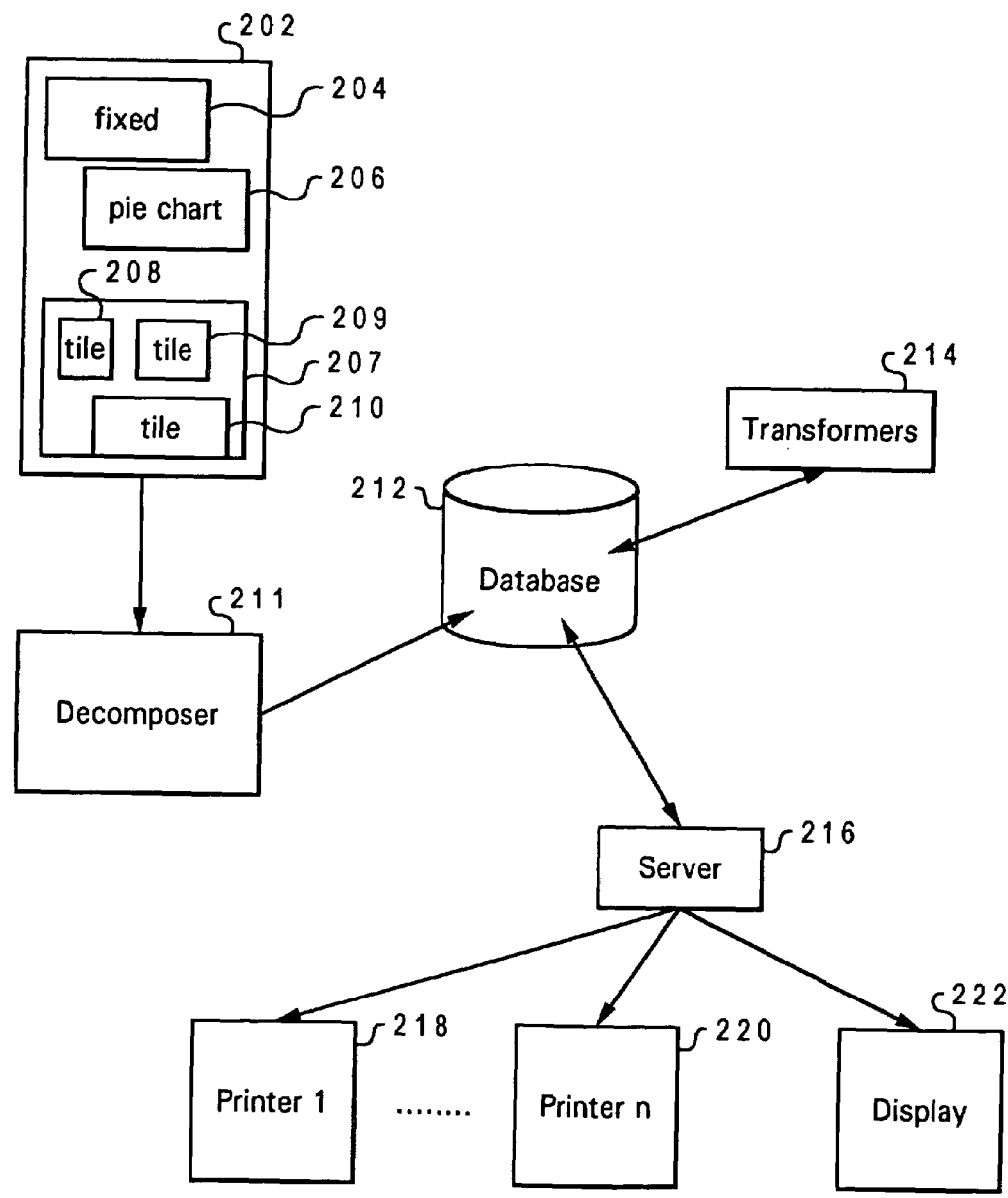
FIG. 2 depicts a high-level block diagram of the data processing system utilizing a document process in accordance with a preferred embodiment of the present invention.

Referring to FIG. 2, a high-level block diagram of the data processing system utilizing a document process in accordance with a preferred embodiment of the present invention, is depicted. Document 202 is scanned and separated into objects by de-composer 211, as is common in modern datastream architectures, such as Mixed Object: Document Content Architecture (MO:DCA™), a product of IBM. The complete document is broken down into objects with fixed 204 representing a block of text on the document, pie chart 206 representing a vector graphics object and object 207 representing and arbitrary object that is composed of tiles 208–210. For this example, the document is stored in CIELab format. CIELab color gets its name from a color space that uses three values to describe the precise three-dimensional location of a color inside a visible color space. CIE stands for Commission International de l-Eclairages an international body of color scientists whose standards make it possible to communicate color information accurately. L describes relative lightness; A represents relative redness-greenness, and B represents relative yellowness-blueness.

Each tile in the source document is preferably specified in device-independent format. For example, if the tiles are part of an image object, the color is specified in a device-independent color space such as CIELab. However, to optimize presentation speed, each tile is regenerated in a number of device-specific formats that are tuned to the various output devices on the system. A system that is required to present documents on display screen 222, print documents on a full-color CMYK printer and proof documents on a monochrome printer might generate every color image tile in three additional device-dependent formats: 24 bit RGB at 72 dots per inch for the display; 32 bit CMYK at 300 dpi for the color printer and 1 bit bi-level at 600 dpi for the monochrome proofing printer. This relieves the output device from having to spend processing power and time to convert the tiles to device-specific format.

Object 207 is divided into tiles that become storage units. Each tile is encoded using the device independent format (e.g., CIELab data) and in device specific formats. A system that is required to present documents on display screen 222, print the documents on a 32 bit CMYK printer or on a bilevel proof printer might keep every color image tile in four formats: 24 bit CIELab, 24 bit RGB, 32 bit CMYK and bilevel. CMYK and bilevel tiles would be generated for the particular printers used, since both conversion to CMYK and halftoning to bilevel are heavily device dependent.

Document 202 is broken down into objects for storage and transmitted to a storage medium, in this instance a database residing on a server in the system. Transformers 214 is logic on the system that stores the objects in the proper and efficient format. Like objects (common format) are stored with like objects in the database. At presentation time, server 216 receives a request to print document 202 to a particular printer (printer 1 218) and at the same time display document 202 on display 222. If Printer 1 218 is a full-color, 300 dpi CMYK printer, any objects or tiles that require intensive computation to convert from device-independent format, such as CIELab raster image tiles, are sent to the printer in the previously generated device-dependent format. Objects that are transformed easily into printer format, such as color text, are sent to the printer in device-independent format. Similar processing occurs for the display, except in this case, the device-dependent format for raster image tiles is 24 bit RGB at 72 dpi. Database 212 assembles the document from the stored units (tiles) based on the requirements of the presentation device (printer and display). The document received by the particular device is composed of data that is either specific for that device or device independent, but easy to convert to device specific form.

Figure 3:
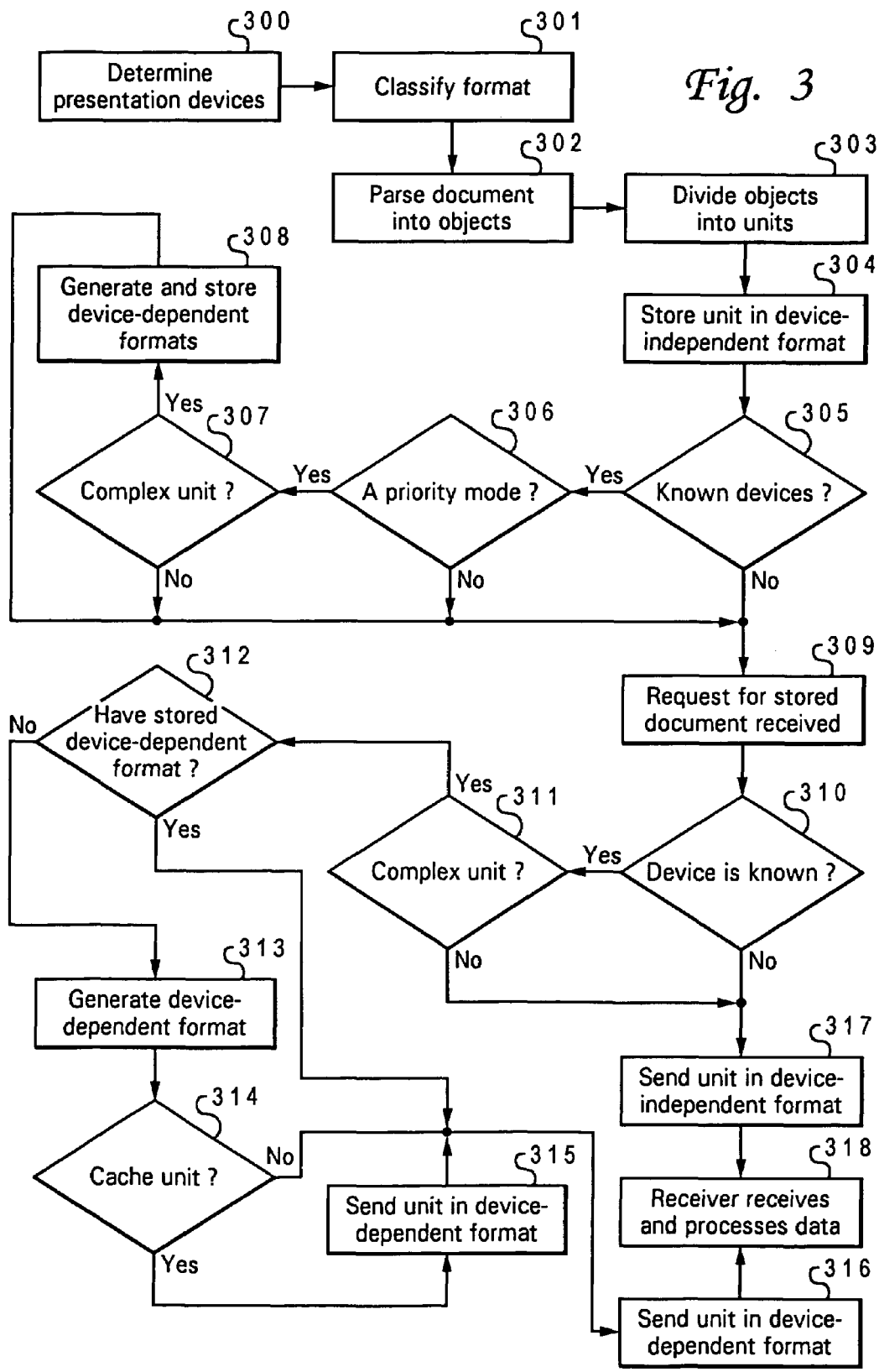
FIG. 3 illustrates a high-level flow diagram of a process for improving processing requirements and processing time for document presentation in accordance with a preferred embodiment of the present invention.

Referring to FIG. 3, a high-level flow diagram of a process for improving processing requirements and processing time for document presentation in accordance with a preferred embodiment of the present invention, is illustrated. The process is divided into two stages: a first stage that processes and stores each document in the system (comprising steps 300–308) and a second stage that serves the stored document to receivers such as printers and displays (comprising steps 309–318).

The process begins with step 300, which depicts analyzing a document received by the system to determine possible recipient devices present and available on the system. It is important to note that possible output devices may vary from document to document. The process proceeds to step 301, which illustrates analyzing the format of the document. The step then passes to step 302, which depicts parsing the document into objects. Next, the process moves to step 303, which illustrates dividing each object into component units. For example, if the object is an image each data unit could be a tile.

The process continues with step 304, which depicts storing the component units in device-independent format to preserve unit information. The process next proceeds to step 305, which illustrates a determination of whether the possible recipients of the document are known devices. If the possible recipients of the document are not known devices, the process passes to step 309, terminating the first stage. If the recipients of the document are known devices the process instead proceeds to step 306, which depicts a determination of whether a priori mode should be utilized. In a priori mode, the device-dependent formats are computed in advance for selected known output devices (recipients). If the determination is made that the a priori mode is not utilized, the process passes to step 309, terminating the first stage. If the determination is made that the a priori mode is utilized, the process instead proceeds to step 307, which depicts a determination of whether the unit data type is complex.

If the determination is made that the unit data type is not complex, the process proceeds to step 309, which illustrates beginning the second stage. Units classified as "not complex" are data types that do not require intensive processing for generation of the device-specific format. An example would be text designed to be printed as black. If the determination is made that the unit data type is complex, the process then proceeds to step 308, which depicts generating and storing device-dependent formats for each selected device in the system. Note that selected devices may vary for different data types in the same system since a data type may be complex for some device types and not complex for others. The range of devices is a subset of the devices determined to be on the system in step 300.

The process continues with step 309, which illustrates receiving a request for a particular document. The process then proceeds to step 310, which depicts a determination of whether the targeted recipient device is known. The device is "known" if its device-dependent data formats are known. If the determination is made that the device is not known, the process passes to step 317, which illustrates sending the unit data in device independent format to a receiving device such as a printer or display. The process continues to step 318, which depicts the receiving device receiving and processing the data.

Returning to step 310, if the determination is made that the device is known, the process instead passes to step 311, which illustrates determining whether the data is a complex data unit. If the determination is made that the unit of data is not complex for the target output device, the process passes to step 317, which illustrates sending the unit data in device independent format to a receiving device such as a printer or display. The process continues to step 318, which depicts the receiving device receiving and processing the data. If the determination is made that the unit is complex for the target device, the process continues to step 312, which illustrates a determination of whether the unit is stored in device-dependent format for the target device. If the determination is made that the unit is stored in device-dependent format, the process proceeds to step 316, which depicts sending the unit to the target device in device-dependent format. If the determination is made that the unit is stored in device-independent rather than device-dependent format, the process proceeds instead to step 313, which illustrates the system generating device-dependent format from the device-independent format. As detailed above, device-independent format is always available as it has been stored in that format to preserve all the information (see step 304).

The process then passes to step 314, which depicts a determination of whether the data should be saved for later re-use. Different rules may be formulated to determine caching such as a likelihood that this unit will be requested again by the target receiving device or the storage capacity, usage and processing required to generate the device-dependent format. If the determination is made that the device-dependent format is not to be cached, the process passes to step 316, which illustrates sending the unit in the device dependent format to the target receiving device. If the determination is made that the device-dependent unit is to be cached, the process instead moves to step 315, which depicts the unit being stored in device-dependent format. The process then proceeds to step 316, which illustrates sending the unit, in device-dependent format, to the target receiving device. The process then passes to step 318 which depicts the target receiving device receiving and processing the unit data for presentation Once the document or data set is divided into units, the question is how much processing power is required to convert a unit (of the document) from device-independent format to device-dependent format. The present invention precludes the need to invoke significant processing power in the presentation (output) device at presentation time. The present invention invokes the processing power in the server before presentation time.

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programing code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

While the invention has been particularly shown and described with reference to a preferred embodiment, it will be understood by those skilled in the art that various changes in form and detail may be made therein without departing from the spirit and scope of the invention.

What is claimed is:

1. In a data processing system having a central processing unit, and memory, a method for retrieving and presenting stored documents on one or more output devices that each requires device-specific presentation parameters, said method comprising:

parsing a document into one or more subcomponents, said subcomponents collectively representing the document when compiled for output to a presentation device, wherein each of said one or more subcomponents have a determinable presentation complexity;

identifying one or more presentation devices to which the document may be outputted, said identifying including determining a presentation format supported by each of the one or more presentation devices;

for each subcomponent, determining whether the subcomponent is complex based on an amount of processing required to convert said subcomponent from device-independent format to device-dependent format, wherein the subcomponent is determined to be a complex subcomponent if the subcomponent requires more than a predetermined amount of processing to convert from the device-independent format to the device-dependent format;

converting a copy of each complex subcomponent into a device-dependent format corresponding to the presentation format supported by each specific device of the one or more presentation devices for which the subcomponent is determined to be complex, wherein when multiple presentation devices are identified by the data processing system for completing subsequent presentations, multiple copies of the complex subcomponent are generated and converted into a specific presentation format supported by each of the multiple presentation devices;

storing, in device-independent format, each subcomponent that is not determined to be a complex subcomponent as a non-complex subcomponent, wherein said non-complex subcomponent requires less data processing to convert to said device-dependent format than the predetermined amount of data processing required for the complex subcomponent;

storing said complex subcomponents in said device-independent format and each of said device-dependent formats associated with the identified presentation devices, wherein multiple copies of the complex subcomponent are stored with a first copy being stored in device-independent format and each other copy being stored in a format supported by the respective presentation device.

2. The method of claim 1, further comprising:

when a request is received to output a copy of the document to a selected one of the multiple presentation devices, identifying the selected presentation device and the format supported by that selected presentation device;

assembling said document from said stored non-complex subcomponents and specific device-dependent copy of the complex subcomponents that are stored in the format supported by that selected presentation device; and sending the non-complex and specific device-dependent copy of the complex subcomponents of the assembled document to said presentation device, wherein the selected presentation device does not have to convert complex subcomponents within the document into device-dependent format during an actual presentation period and overall processing time involved with document output to the presentation device is substantially reduced.

3. The method of claim 1, wherein identifying said presentation devices, further comprise:

determining acceptable document formats for said presentation devices; and classifying said devices according to device-dependent characteristics.

4. The method of claim 1, further comprising:

enabling user setting of a mode of processing and storage of documents from among a first mode and a second mode, wherein said first mode triggers a storage of complex subcomponents in both device-dependent and device-independent formats and the second mode stores all subcomponents in only device-independent format; and triggering said automatic storage in device-dependent format only when said first mode is selected for processing, whereby subsequent presentations on the selected presentation device access the stored, device-dependent copies of the complex subcomponents to reduce presentation time.

5. The method of claim 1, wherein said parsing further comprises:

first parsing the document into one or more objects;

then parsing each object into one or more units, which represent the one or more subcomponents; and determining a type of each of said subcomponents.

6. The method of claim 2, further comprising:

receiving a request from a peripheral presentation device for sad document;

determining whether said peripheral presentation device is known or unknown, wherein said peripheral presentation device is know if the peripheral presentation device is one of the one or more presentation devices identified in said identifying step and which as a copy of the complex subcomponents stored in the format supported by that peripheral presentation device; and when the device is not known, completing the determining and converting steps prior to forwarding the subcomponents for generating the document to the peripheral presentation device.

7. The method of claim 2, further comprising:

when the request is received, determining whether there are device-dependent copies of complex subcomponents previously generated and stored for that selected presentation device;

when no device-dependent copies of complex subcomponents have been generated and there are complex subcomponents identified within the document:

dynamically generating a device-dependent copy of the complex subcomponents in the format supported by the selected presentation device; and storing the device-dependent copy of the complex subcomponents generated for that selected presentation device.

8. In a data processing system having a central processing unit and memory, a computer program product on a computer readable medium having instructions for storing, retrieving and presenting stored documents on one or more output devices that each requiring different presentation parameters, said program product comprising:

instruction within said computer program product for parsing a document into one or more objects; and instructions within said computer program product for parsing each object into one or more units, said units collectively representing the document when complied for output to a presentation device, wherein each of said one or more units have a determinable presentation complexity;

instructions within said computer program product for identifying one or more presentation devices to which the document may be outputted, said identifying including determining a presentation format supported by each of the one or more presentation devices;

for each unit, instructions for determining whether the unit is complex based on an amount of processing required to convert said unit from device-independent format to device-dependent format, wherein the unit is determined to be a complex unit if the unit requires more than a predetermined amount of processing to convert from the device-independent format to the device-dependent format;

instructions within said computer program product for converting a copy of each complex unit into a device-dependent format corresponding to the presentation format supported by each specific device of the one or more presentation devices for which the unit is determined to be complex, wherein when multiple presentation devices are identified by the data processing system for completing subsequent presentations, multiple copies of the complex unit are generated and converted into a specific presentation format supported by each of the multiple presentation devices;

instructions within said computer program product for storing, in device-independent format, each unit that is not determined to be a complex unit as a non-complex unit, wherein said non-complex unit requires less data processing to convert to said device-dependent format than the predetermined amount of data processing required for the complex unit;

instructions within said computer program product for storing said complex units in said device-independent format and each of said device-dependent formats associated with the identified presentation devices, wherein multiple copies of the complex unit are stored with a first copy being stored in device-independent format and each other copy being stored in a format supported by the respective presentation device.

9. The computer program product of claim 8, further comprising:

instruction within said computer program product for identifying the selected presentation device and the format supported by that selected presentation device, when a request is received to output a copy of the document to a selected one of the multiple presentation devices;

instruction within said computer program product for assembling said document from said stored non-complex units and specific device-dependent copy of the complex units that are stored in the format supported by that selected presentation device; and instruction within said computer program product for sending the non-complex and specific device-dependent copy of the complex units of the assembled document to said presentation device, wherein the selected presentation device does not have to convert complex units within the document into device-dependent format during an actual presentation period and overall processing time involved with document output to the presentation device is substantially reduced.

10. The computer program product of claim 8, wherein instructions for identifying said presentation devices, further comprises:

instructions within said computer program product for determining acceptable document formats for said presentation devices; and instructions within said computer program product for classifying said devices according to device-dependent characteristics.

11. The computer program product of claim 8, further comprising:

instructions for receiving a request from a presentation device for said document;

instructions within said computer program product for determining whether said peripheral device is known or unknown, wherein said presentation device is know if the presentation device is one of the one or more presentation devices identified in said identifying step and which has a copy of the complex unit stored in the format supported by that presentation device; and instructions within the computer program product for completing the determining and converting steps prior to forwarding the units for generating the document to the presentation device, when the presentation device is not known.

12. The computer program product of claim 8, further comprising:

enabling user setting of a mode of processing and storage of documents form among a first mode and a second mode, wherein said first mode triggers a storage of complex units in both device-dependent and device-independent formats and the second mode stores all units in only device-independent format; and triggering said automatic storage in device-dependent format only when said first mode is selected for processing, whereby subsequent presentations on the selected presentation device access the stored, device-dependent copies of the complex subcomponents to reduce presentation time.

13. The computer program product of claim 9, further comprising:

when the request is received, instructions within the computer program product for determining whether there are device-dependent copies of complex units previously generated and stored for that selected presentation device;

when no device-dependent copies have been generated and there are complex subcomponents identified within the document:

instructions within the computer program product for dynamically generating a device-dependent copy of the complex units in the format supported by the selected presentation device; and instructions within the computer program product for storing the device dependent copy of the complex unit generated for that selected presentation device.

* * * * *